(12) United States Patent
Ennsbrunner et al.

(10) Patent No.: US 10,821,537 B2
(45) Date of Patent: Nov. 3, 2020

(54) METHOD FOR ESTABLISHING WELDING PARAMETERS FOR A WELDING PROCESS

(71) Applicant: Fronius International GmbH, Pettenbach (AT)

(72) Inventors: Helmut Ennsbrunner, Pettenbach (AT); Daniel Angermayr, Pettenbach (AT); Manfred Schoerghuber, Pettenbach (AT); Bernhard Moertendorfer, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 0 days.

(21) Appl. No.: 16/317,115

(22) PCT Filed: Jul. 12, 2017

(86) PCT No.: PCT/EP2017/067475
§ 371 (c)(1),
(2) Date: Jan. 11, 2019

(87) PCT Pub. No.: WO2018/011243
PCT Pub. Date: Jan. 18, 2018

(65) Prior Publication Data
US 2019/0240759 A1    Aug. 8, 2019

(30) Foreign Application Priority Data

Jul. 12, 2016    (EP) .................................. 16179017

(51) Int. Cl.
*B23K 9/095* (2006.01)

(52) U.S. Cl.
CPC .. *B23K 9/0953* (2013.01); *G05B 2219/45135* (2013.01)

(58) Field of Classification Search
CPC .............. B23K 9/0953; G05B 2219/45; G05B 2219/45135
(Continued)

(56) References Cited

U.S. PATENT DOCUMENTS

| 4,071,732 A | * | 1/1978 | Tanaka | ................... B23K 9/173 |
| | | | | 219/137 R |
| 4,578,562 A | | 3/1986 | Lindström et al. | |

(Continued)

FOREIGN PATENT DOCUMENTS

| CN | 102165504 A | 8/2011 |
| CN | 103273166 A | 9/2013 |

(Continued)

OTHER PUBLICATIONS

Chinese Office Action in Chinese Application No. 201780043265.1 dated Jul. 4, 2019 with English translation.

(Continued)

*Primary Examiner* — Dana Ross
*Assistant Examiner* — Kuangyue Chen
(74) *Attorney, Agent, or Firm* — Collard & Roe, P.C.

(57) ABSTRACT

A method for establishing welding parameters for a welding process guides a welding torch along a predetermined welding path over the workpiece to be worked and sets welding parameters based on the respective path position for workpiece working. Before establishing the parameters, ideal parameters are determined by test welding processes on test workpieces along test welding paths, with a respective specific test workpiece position and arrangement relative to the gravitational acceleration vector and a specific tangential vector of the test path, and are stored. The parameters at the respective path position are established based on workpiece position and arrangement at the time relative to the welding path gravitational acceleration vector and tangential vector (Continued)

at the time by interpolation of the stored ideal parameter values for the determined positions and arrangements of the test workpieces relative to the gravitational acceleration vector and the specific tangential vectors of the test paths.

16 Claims, 8 Drawing Sheets

(58) Field of Classification Search
USPC .................................................. 219/130.21
See application file for complete search history.

(56) References Cited

U.S. PATENT DOCUMENTS

| | | | |
|---|---|---|---|
| 4,883,938 A | 11/1989 | Sarugaku | |
| 6,479,793 B1 | 11/2002 | Wittmann et al. | |
| 2007/0262064 A1* | 11/2007 | Daniel | B23K 9/0953 219/130.01 |
| 2010/0062406 A1 | 3/2010 | Zboray et al. | |
| 2010/0288734 A1* | 11/2010 | Dave | B23K 9/0953 219/73.2 |
| 2010/0314371 A1 | 12/2010 | Davidson et al. | |
| 2014/0097166 A1* | 4/2014 | Flattinger | B23K 9/1336 219/137.31 |
| 2015/0352653 A1 | 12/2015 | Albrecht et al. | |
| 2016/0193679 A1 | 7/2016 | Zhang et al. | |
| 2018/0117718 A1* | 5/2018 | Rajagopalan | B23K 37/0531 |
| 2019/0240759 A1* | 8/2019 | Ennsbrunner | B23K 9/0953 |

FOREIGN PATENT DOCUMENTS

| | | | | |
|---|---|---|---|---|
| JP | S59-200311 A | | 11/1984 | |
| JP | S63-268568 A | | 11/1988 | |
| JP | H09-10939 A | | 1/1997 | |
| WO | 2006/037200 A1 | | 4/2006 | |
| WO | 2006/097626 A1 | | 4/2006 | |
| WO | 2006/097626 A1 | | 9/2006 | |
| WO | WO-2006097626 A1 | * | 9/2006 | ........... B23K 9/0286 |
| WO | 2015/187283 A1 | | 12/2015 | |

OTHER PUBLICATIONS

Japanese Office Action in Japanese Application No. 2019-501681, with English translation, Jul. 30, 2019.
International Search Report of PCT/EP2017/067475, dated Oct. 17, 2017.
Written Opinion of International Searching Authority in PCT/EP2017/067475, dated Jan. 18, 2018, with English translation of relevant parts.
European Search Report in EP 16179017.5-1702, dated Oct. 20, 2016, with English translation of relevant parts.
Indian Office Action in Indian Application No. 201817050018, dated Jul. 30, 2020, with English translation.

* cited by examiner

METHOD FOR ESTABLISHING WELDING PARAMETERS FOR A WELDING PROCESS

CROSS REFERENCE TO RELATED APPLICATIONS

This application is the National Stage of PCT/EP2017/067475 filed on Jul. 12, 2017, which claims priority under 35 U.S.C. § 119 of European Application No. 16179017.5 filed on Jul. 12, 2016, the disclosure of which is incorporated by reference. The international application under PCT article 21(2) was not published in English.

The invention relates to a method for establishing welding parameters for a welding process in which a welding torch is guided along a predefined arbitrary welding path over the at least one workpiece to be worked and specific welding parameters depending on the respective position on the welding path are set for the working of the at least one workpiece.

Welding processes are frequently very complex processes since welding processes operate on workpiece surfaces whose geometry differs for almost every welding task. In addition, a plurality of parameters such as welding current, material of the workpiece, conveying speed and material of the welding wire, to mention just a few, act on the welding process. Furthermore, welding processes have a strongly movement-dependent component, i.e. angle of attack of the welding torch, welding speed, workpiece position etc. influence the welding process. In this case, it is actually incidental whether the workpiece or the welding torch is moved, on the contrary the relative speed between workpiece and welding torch is crucial for the welding process. The welding path is that path covered by the tool centre point (TCP) of the welding torch along the surface of the workpiece. As a result of the varying workpiece geometry and position along a predefined welding path, the welding parameters must possibly be established differently at many points on the welding path. The establishment of welding parameters for a welding task is accordingly complex and can only be mastered by specialists.

WO 2006/037200 A1 discloses a robot system for the orbital welding of pipelines in which the welding path runs along the outer circumference of the pipeline. During a welding over the outer circumference of a horizontal pipe along a circular orbit, the welding process must be carried out in different welding positions, namely the flat position PA, vertical-down position PG, overhead position PE and vertical-up position PF, as well as transitions thereof. To this end, it is proposed in WO 2006/037200 A1 to establish the welding parameters in advance at the predefined positions PA, PG, PE and PF. In addition, an inclination sensor is provided in order to determine the location of the welding torch or the position of the welding torch along the welding path. On the basis of the determined position, the welding parameters at the transitions between the different welding positions PA, PG, PE and PF are established by interpolation. Welding current, welding voltage, stick-out of the welding wire, angle of attack of the welding torch and welding speed are given as welding parameters to be set. Here also specialists are required for determining the welding parameters at specific positions even for the welding path along the outer circumference of a pipeline which is geometrically easy to represent. However, this prior art does not give any instructions for welding processes along arbitrary welding paths or for non-cylindrical workpieces.

WO 2006/097626 A1 also discloses a method for welding pipes, wherein in order to take into account the influence of gravity on the melt bath and increase the weld quality, at least one welding parameter is varied continuously as a function of the angular position of the welding torch. In this case, a horizontal or only slightly inclined position of the pipes to be welded is assumed.

The object of the present invention consists in providing an above-mentioned method for parametrizing a welding process or establishing welding parameters for a welding process, by means of which welding processes can be parametrized along arbitrary welding paths without any assistance of a specialist in order to be able to carry out the welding process with optimal welding parameters in each case.

The object according to the invention is solved by the above-mentioned method for parametrizing a welding process in which, before establishing the welding parameters of the welding process, ideal welding parameters are determined by means of test welding processes on several test workpieces along test welding paths under a specific position and arrangement of the test workpieces in each case in relation to the gravitational acceleration vector and a specific tangential vector of the test welding path and are stored, and the welding parameters at the respective position on the welding path for the welding process to be carried out are established depending on the actual position and arrangement of the at least one workpiece in relation to the gravitational acceleration vector and the actual tangential vector of the welding path by interpolation of the values of the stored ideal welding parameters for the specific positions and arrangements of the test workpieces in relation to the gravitational acceleration vector and the specific tangential vectors of the test welding paths.

According to the invention, before establishing the welding parameters of the welding process, ideal welding parameters are determined with the aid of test welding processes on several test workpieces along test welding paths under a specific position and arrangement of the test workpieces in each case in relation to the gravitational acceleration vector and a specific tangential vector of the test welding path and are stored. The tangential vector can be determined at any point on the welding path from the movement of the TCP along the welding path. The direction of movement of the tangential vector corresponds to the direction of movement of the TCP at the respective point of the welding path. As a result, the linking of actual workpiece geometry and establishing the ideal welding parameters can be broken. In this connection, ideal welding parameters for specific tasks designate optimized welding parameters. Depending on the welding task, for example, welding speed, penetration depth or also a visually pleasing weld seam can be of particular importance and the welding parameters are adapted and optimized accordingly. Since the relative movement of the welding torch with respect to the workpiece in the region of the welding path and their respective alignment with respect to the gravitational acceleration in general have a major influence on the welding process, these are stored in the form of the tangential vector of the welding path and the position and arrangement of the test workpieces in relation to the gravitational acceleration vector together with the ideal welding parameters. This is necessary since welding processes and welding parameters are particularly strongly influenced by the movement and position since different forces act on the liquefied metallic material which occurs during the welding process. These forces are influenced by the electric arc, surfaces tensions, solid workpiece components and gravitation. Position and arrangement of the workpieces in relation to the gravitational acceleration vector therefore together with the tangential vector of the welding path have a crucial influence on the welding process or the welding parameters. The gravitational acceleration vector can in this case be defined in the coordinate system of a process robot or however also implicitly via a known mounting position of the process robot. It is also conceivable to record the gravitational acceleration vector by means of sensors, preferably on non-accelerated process components. The definition of the gravitational acceleration vector in the coordinate system in which arrangement and position of the workpieces are given can, however, also be accomplished by transformation from a different coordinate system in which the gravitational acceleration vector is known. The actual position and arrangement of the workpieces in relation to the gravitational acceleration vector can be determined in various ways so that this can be taken into account in the present method. For example, the position and arrangement of the workpieces can be determined by taking over CAD data relating to the workpieces to be welded. Also a preferably visual and contactless scanning of the workpieces to be welded is possible to determine the position and arrangement in relation to the gravitational acceleration vector. Also the position and arrangement of the workpieces can be determined by so-called "teaching" of a welding path. At all points having the same position and arrangement of the workpieces in relation to the gravitational acceleration vector and the same tangential vector of the welding path, the welding process can be carried out to achieve approximately the same results with the same welding parameters. Specialists can determine these ideal welding parameters which fulfil the requirements of the welding tasks relatively simply and without time pressure on test workpieces. In this case, the test workpieces preferably consist of the same material, have the same surface and have a similar form of connection as in the welding task to be carried out. The welding parameters are determined for various positions and arrangements of the test workpieces in relation to the gravitational acceleration vector and also for different tangential vectors of the test welding path. Then, the welding parameters are established at the respective position on the welding path for the welding process to be carried out depending on the actual position and arrangement of the at least one workpiece in relation to the gravitational acceleration vector and the actual tangential vector of the welding path by interpolation of the values of the stored ideal welding parameters for the specific positions and arrangements of the test workpieces in relation to the gravitational acceleration vector and the specific tangential vectors of the test welding paths. At those points along the welding path of the at least one workpiece, at which the position and location of the workpiece precisely correspond to the position and location of the test workpiece, the welding parameter agrees precisely with the ideal welding parameter which was determined on the test workpiece. For the further points along the welding path for which there are no corresponding points on the test welding path of the test welding points, an interpolation of the nearest ideal welding parameters is made. In the simplest case, this interpolation can be implemented by a linear interpolation. It is also feasible to interpolate a plurality of ideal welding parameters with higher-degree polynomials or also logarithmically. With the method according to the invention, ideal welding parameters can be recorded in such a form that subsequently the welding parameters of a real welding process on specific workpieces can be established from this automatically and without the assistance of specialists. The welding parameters can then be established before carrying out the welding process and for example, used for a simulation of the welding process. Likewise, it is also feasible to establish the welding parameters in real time during the actual execution of the welding process. Should the computing capacity not be sufficient for this, welding parameters can be assigned in advance to individual parts of the welding path using the described method, wherein again the assistance of a specialist can be dispensed with. In this case, the method can be applied to any welding processes or electric arc processes in which a liquefied material occurs such as, for example, MIG/MAG welding, TIG welding, laser welding and further processes. Furthermore, the method can be used both for welding processes for joining workpieces, deposition welding for depositing additional material on a workpiece, and for generative fabrication methods.

The application of the method can be simplified if at least for individual points along the welding path of the at least one workpiece to be worked and along the test welding path of the test workpieces, a component vector is defined relative to the gravitational acceleration vector from the position and the arrangement of the workpieces or test workpieces in relation to the gravitational acceleration vector. Thus, position and arrangement of the workpiece or the workpieces in the surroundings of the welding path can be recorded and represented by only one vector, the component vector and important information for establishing the parameters of the welding process can be stored. Instead of the complex position and arrangement of the workpieces, the component vector can be stored relative to the gravitational acceleration vector with the ideal welding parameters. The component vector can, for example, be defined in a plane perpendicular to the tangential vector of the welding path and the weld seam to be produced in the plane perpendicular to the tangential vector can be described by its direction. Additional information can be provided by the magnitude of the component vector such as, for example, the position of the upper sheet in the case of an overlap seam, the form of the seam (e.g. fillet weld, butt weld, or the like). If the component vector is now determined at a point on the welding seam of the component vector by the position and arrangement of the workpieces and the tangential vector, these can be compared with the component vector and the tangential vector of ideal welding parameters. A subsequent interpolation of the nearest ideal welding parameters can allow the establishment of the welding parameters for the actual component and tangential vector. The definition of position and arrangement of the workpieces or test workpieces by a component vector can thus reduce the evaluation of position and arrangement of the workpieces to a vector comparison with subsequent interpolation, with the result that the method can easily be implemented by means of electronic data processing. In this case, derived quantities such as, for example, the angles between tangential vector, component vector and gravitational acceleration vector can also be used for the interpolation.

The welding current, the conveying speed of a welding wire, the angle of attack of the welding torch to the workpieces and the welding speed can be selected as welding parameters and determined. However, many other welding parameters which influence the welding process can also be established in the course of the method, for example, pendulum parameters to form wide weld seams, the time sequence of the forward and backward movement of the welding wire in the CMT (cold metal transfer) welding process or the mixture ratio of the gas in inert gas welding to name just a few.

Preferably the ideal welding parameters are determined by means of test welding processes along test welding paths having constant tangential vector and constant component vector and are stored, i.e. tangential vector and component vector have a constant length with respect to the gravitational acceleration vector. Thus, different welding parameters can be varied along a test welding path and after assessing the welding results, the welding parameters in the range which best satisfies the welding task can be determined as ideal welding parameters and stored including component vector and tangential vector. In order to assess the welding result and thus select the ideal welding parameters, methods such as, for example, preparing microsections can also be selected, which could not be performed on the final workpiece or not easily. Thus, costs can be reduced since the tests are only carried out on test workpieces and not on real workpieces.

Advantageously the ideal welding parameters are determined by means of test welding processes on test workpieces with constant curvature along the test welding paths and are stored. Particularly simple test welding paths can be obtained with flat test workpieces since a straight welding path on a flat test workpiece has a constant curvature=0. In addition, test workpieces with constant curvature such as, for example, pipes or also flat test workpieces can frequently be convincing due to simple and cost-effective availability.

Preferably the ideal welding parameters are determined by means of test welding processes along test welding paths between 10 cm and 150 cm long and are stored. In the case of test welding paths of this length, the test welding process can be adjusted and influences of the start or the end region when assessing the parameters set for the test workpieces can be eliminated or at least largely reduced.

If the ideal welding parameters are determined by means of test welding processes with various welding wires having various diameters and various materials and are stored, the diameter and the material of the welding wire used is input to establish the welding parameters of the welding process and the welding parameters for the welding process to be carried out are established depending on the input diameter and materials of the welding wire, the welding parameters can be established matched to the welding wire actually used. This can allow an improved matching of the welding wire to workpiece or welding task and overall ensures an advantageous establishment of the welding parameters of the welding process to be carried out and subsequently a higher welding quality.

The method can be further improved if ideal welding parameters for the beginning are determined as welding start parameters and/or for the end of the test welding process are determined as welding end parameters on test workpieces and stored and if the welding parameters for the welding process to be carried out begin with welding start parameters and/or end with welding end parameters, which are determined according to the respective position and arrangement of the at least one workpiece in relation to the gravitational acceleration vector and the actual tangential vector by interpolation of the values of the stored welding start parameters or welding end parameters for the specific positions and arrangements of the test workpieces in relation to the gravitational acceleration vector and the specific tangential vectors. Welding start parameters and welding end parameters differ from the ideal welding parameters along the welding path insofar as the welding process begins or ends with these parameters. Welding start parameters or welding end parameters define the execution of the start and end process and thus define a sequence which also includes time values and can require movement sequences at one position. In contrast to this, welding parameters along the welding path do not define any sequences and at one position the ideal welding parameters always only have one value. Since at the beginning of the welding process no liquefied material or welding wire is present to form the weld seam, the welding start parameters should accordingly be selected and established differently. The same applies similarly to the end of the welding process in which a corresponding termination of the weld seam is required. By using welding start parameters at the beginning and/or welding end parameters at the end of the welding process, advantageous weld parameters for the welding process to be carried out can be set continuously over the entire welding path including beginning and end. In particular when forming so-called step seams in which the weld seam is regularly interrupted by seamless regions, this can improve the quality and speed of the joining process. If the welding parameters at the beginning of the welding process between the welding start parameter and the ideal welding parameters or at the end of the welding process between the ideal welding parameters and the welding end parameter are interpolated weighted with the distance on the welding path or the time, a continuous transition between welding start parameters or welding end parameters and the ideal welding parameters along the welding path can be achieved. An advantageously configured weld seam can thus be achieved over the entire length of the weld seam.

Advantageously the ideal welding parameters are determined by means of test welding processes at several specific opening angles between the test workpieces and are stored, and the welding parameters for the welding process to be carried out are determined depending on the actual opening angle between the workpieces by interpolation of the values of the ideal welding parameters at the specific opening angles between the test workpieces. Since the opening angle between the workpieces influences the welding process, an improved result of the actual welding task can thus be achieved. The method can be further improved if the ideal welding parameters are set by means of test welding processes at several specific temperatures of the test workpieces and are stored and the welding parameters for the welding process to be carried out are established depending on the determined actual temperature of the at least one workpiece by interpolation of the values of the ideal welding parameters at the specific temperatures of the test workpieces. Since the temperature of the welding process or in the immediate vicinity thereof additionally has an influence on the flow behaviour of the liquefied material and its surface tensions, the welding process can be carried out in an improved manner by adaptations of the welding parameters to the temperature of the welding process. The workpiece temperature before the welding process, for example, has a massive influence on the so-called T8/5 time (gives the time for cooling the workpiece from 800° C. to 500° C. and for steel is an important characteristic for the formation of the grain size or the embrittlement) and thus welding parameters adapted to this end are also important. The determination and storage of ideal welding parameters at several specific temperatures of the test workpieces can allow an advantageous adaptation of the welding parameters to the actual temperature of the workpieces.

If the ideal welding parameters are determined by means of test welding processes under several specific cooling situations of the test workpieces and are stored, the cooling situation of the at least one workpiece is input to establish the welding parameters of the welding process and the welding parameters for the welding process to be carried out are determined as a function of the input cooling situation of the workpiece, the welding parameters can be adapted to the temperature resulting from the cooling situation of the workpieces. This allows an advantageous determination of the welding parameters taking into account the cooling situation which, for example, can be specified by means of thermal conductivity coefficients and cross-sectional areas of the surrounding material.

The method can be further improved if the ideal welding parameters are determined by means of test welding processes comprising different materials and are stored, the material of the at least one workpiece is input to establish the welding parameters of the welding process and the welding parameters for the welding process to be carried out are established depending on the input material of the workpiece.

If the ideal welding parameters are determined by means of test welding processes under several specific geometrical conditions for the test workpieces and are stored, and the welding parameters for the welding process to be carried out are established depending on the determined actual geometrical conditions for the workpieces by interpolation of the values of the ideal welding parameters under the specific geometrical conditions for the test workpieces, it is possible to respond to changed geometrical conditions and the welding parameters can be adapted to the changed geometrical conditions. The geometrical conditions to be taken into account can be gap width, workpiece offset, angle between the workpieces, fluctuation of the so-called processing and the like. Thus, for example, by recording the gap width during execution of the welding process, it is possible to respond to a changing gap width in the course of the welding path by determining the welding parameters from ideal welding parameters for the specific positions and arrangements in relation to the gravitational acceleration vector, the specific tangential vectors and the specific geometrical condition, in this case the gap width. In this case, an interpolation can also be carried out for the geometrical condition. If, for example, ideal welding parameters are stored for a gap width of 2 mm and 4 mm, in the case of a measured gap width of 3.5 mm as geometrical condition, it is possible to interpolate accordingly between the ideal welding parameters for 2 mm and 4 mm. This method can be particularly distinguished if the geometrical conditions on the workpiece are recorded in real time and the welding parameter adapted to the changing geometrical conditions during the welding process according to the method. Thus, it is possible to respond ideally to different geometrical conditions as a result of workpiece tolerances or tolerances in the arrangement of the workpieces during the welding process. Here also an ideal reaction means a reaction optimized to the welding task and is determined by the specialist in the test welding processes to determine the ideal welding parameters. The welding parameters can thus be determined according to the recorded actual geometrical conditions or according to the actual deviations on the basis of tolerances. In this way, a welding process can be achieved with ideal welding parameters corresponding to the geometrical conditions.

Further advantages are obtained if the welding parameters for the welding process to be carried out on the at least one workpiece are established taking into account the respective radius of curvature at the respective position along the welding path. In addition to the tangential vector of the welding path, the radius of curvature of the welding path can also have an influence on the welding parameters. For example, in the case of small radii of curvature, the welding process takes place in a locally delimited region with the result that an increased heating of the workpiece can be expected. In the case of small radii of curvature, the forces exerted on the liquefied material as well as the heat dissipation can differ significantly from the forces and heat dissipation in the case of large radii of curvature. Taking into account the radius of curvature when storing the ideal welding parameters and establishing the welding parameters can thus result in an improved welding process.

If the welding parameters for the welding process to be carried out on the at least one workpiece are established taking into account the geometry of the workpiece in the surroundings of the respective position along the welding path, this can also improve the welding process. The geometry of the workpieces in the surroundings of the respective position also influences the welding process. On the one hand, this is due to the workpiece volume in the region of the actual position which influences the heat transport from the weld point. On the other hand, the surface geometry has a direct influence on the liquefied material. Taking into account the geometry of the workpiece in the surroundings of the respective position can thus also improve the welding process to be carried out. Simple allowance for the geometry of the workpieces can be made via the thickness of the workpieces at the weld seam or also via the volume of the workpieces adjoining the seam.

The welding parameters for the welding process to be carried out can be established at regular time intervals or regular distances on the welding path.

An exemplary implementation of the method is explained in detail by reference to the appended exemplary drawings. In the figures:

FIG. 10b shows a plan view of the test workpieces according to FIG. 10a.

Figure 1:
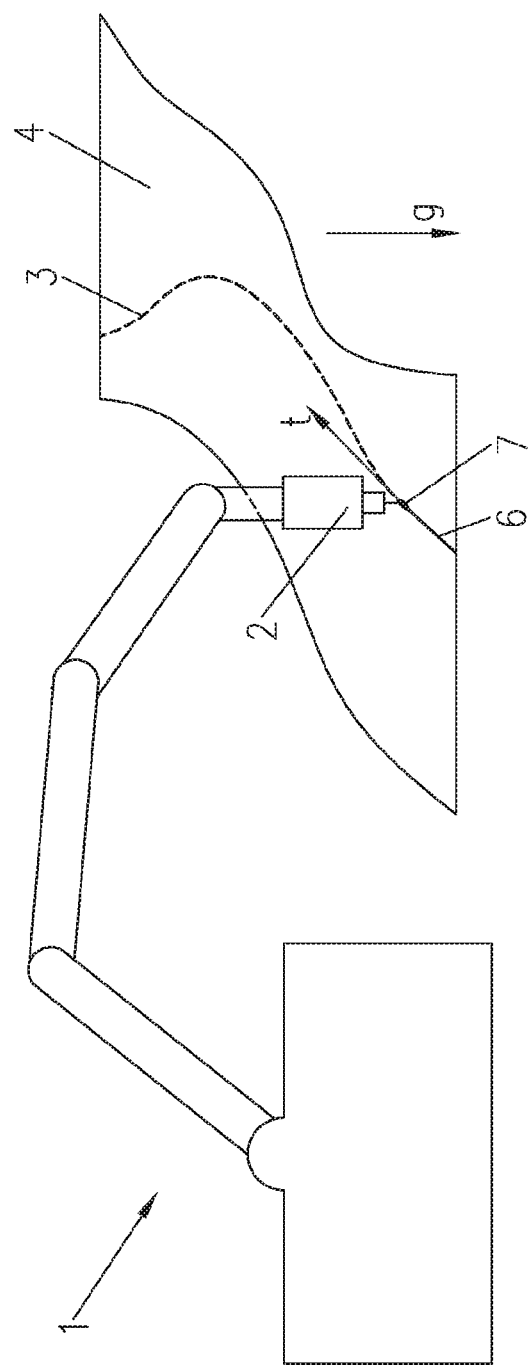
FIG. 1 shows a schematic overview diagram of a welding process.

FIG. 1 shows a schematic overview diagram of a welding process wherein a process robot 1 guides a welding torch 2 along a predefined welding path 3 over at least one workpiece 4 to be worked. In the exemplary embodiment shown the welding torch 2 is guided along the surface of the workpiece 4. Alternatively to this, the workpiece 4 can also be moved with the welding torch 2 fixed or a simultaneous movement of welding torch 2 and workpiece 4 can be made. The crucial thing is a relative movement between welding torch 2 and workpiece 4 along the welding path 3. For the welding process specific welding parameters P must be set depending on the respective position and arrangement of the workpiece 4 and the welding path direction which corresponds to the tangential vector t of the welding path 3. The welding process and therefore the weld seam 6 are influenced by means of these welding parameters P. In this case, there are different requirements for the weld seam 6 depending on the respective welding task. For example, the welding process can be optimized by setting the welding parameters P for welding speed, penetration depth or also a visually appealing weld seam 6.

In addition, welding processes have a strong position- or movement-dependent component. The liquefied material 7 at the centre of the welding process is differently influenced by gravity depending on the arrangement and position of the workpieces 4. Only the two extreme examples of flat position and overhead position are compared. The same also applies to the movement direction of the welding torch 2, as for example in the vertical-down position or vertical-up position. By determining the welding parameters P such as, for example, welding speed, angle of attack of the welding torch, welding current, to name just a few, the forces on the liquefied material 7 are varied and the welding process optimized for the actual welding task. As a result of the position and geometry of the workpiece 4 along a predefined welding path which additionally varies in almost every welding task, the establishment of welding parameters P is usually a task to be carried out by specialists.

In order to be able to preferably automatically determine the welding parameters P on the actual workpiece 4 without specialists, ideal welding parameters Pi are determined before establishing the welding parameters P of the welding process. The ideal welding parameters Pi which fulfil the welding task according to the specifications (welding speed, penetration depth, seam surface, A-dimension . . . ) are determined by appropriate specialists. The ideal welding parameters Pi are determined in test welding processes on several test workpieces 8 along test welding paths 9 and stored. The relative movement of the welding torch 2 with respect to the test workpieces 8 along the test welding path and its respective alignment with respect to the gravitational acceleration vector g have great influence on the test welding process. Thus, with the ideal welding parameters Pi at the same time the position and arrangement of the test workpieces 8 in relation to the gravitational acceleration vector g and the tangential vector t of the test welding path 9 are stored for the respective point at which the ideal welding parameter Pi was determined. This allows the linking of actual workpiece geometry and establishment of the welding parameters P for the welding process to be carried out by the specialists to be interrupted. The welding process with the same welding parameters P specifically yields comparable results at all points with the same position and arrangement of the workpieces 4, 8 in relation to the gravitational acceleration vector g and the same tangential vector t of the welding path 3, 9. The tangential vector t corresponds to the direction of the test welding path 9 or welding path 3 at the respective actual point. In this case, the results of the welding process under the same ambient conditions and comparable geometrical conditions have the highest agreement.

The determination and storage of the ideal welding parameters Pi for the specific arrangement of the test workpieces 8 is now explained in detail with reference to FIGS. 2a to 2f and FIGS. 3a and 3b. The flat test workpieces 8 preferably consist of the same material and have a similar surface to the workpieces 4 of the real welding task. The test workpieces 8 should therefore be the same as the workpieces 4 of the actual welding task with regard to the welding properties.

Figure 2A:
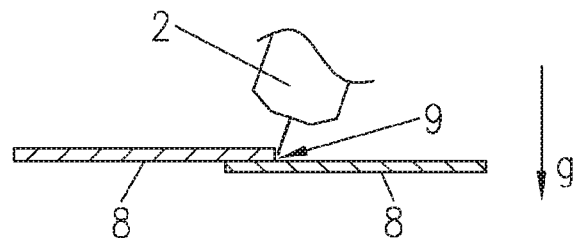
FIGS. 2a-2f show test workpieces for an overlap seam with horizontal weld seams in various positions.
Figure 2B:
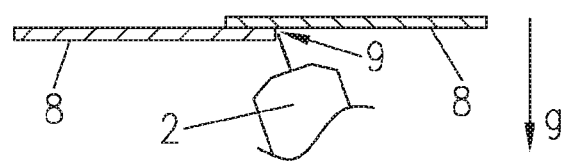
Figure 2C:
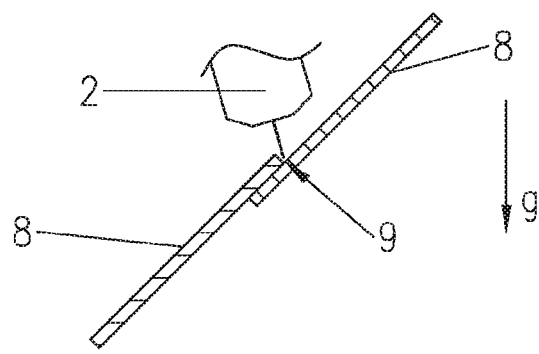
Figure 2D:
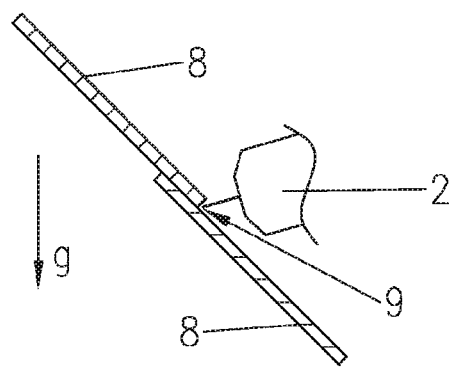
Figure 2E:
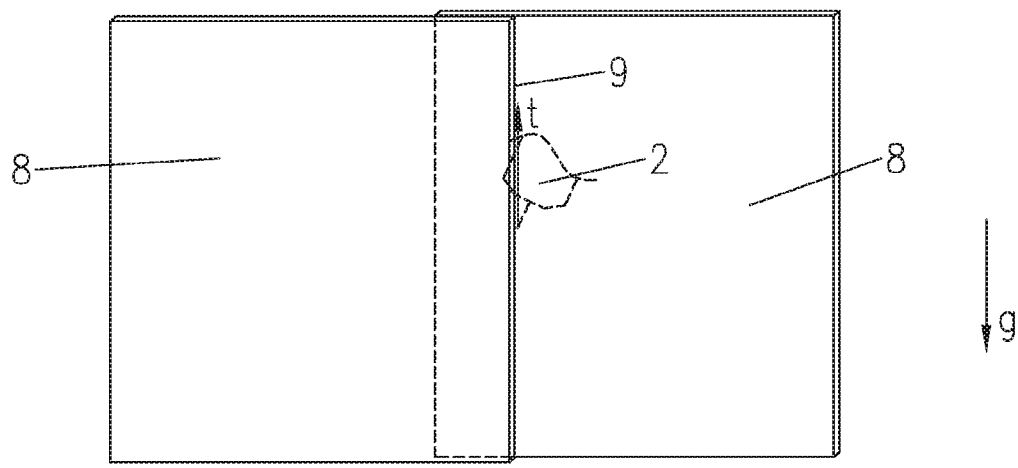
Figure 2F:
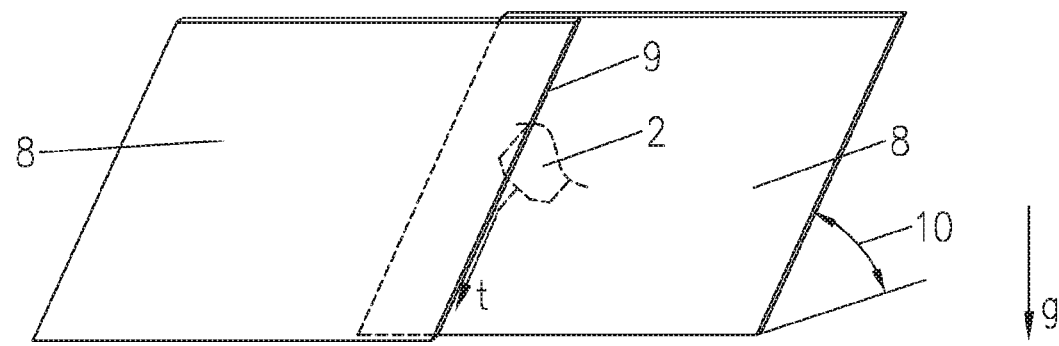

According to FIG. 2a, for example, first the ideal welding parameters Pi of an overlap seam in a first position, here in the flat position, are recorded and stored. To this end, the ideal welding parameters Pi during execution of a test welding process are determined by a specialist according to the welding task. If the welding task is fulfilled satisfactorily and if no improvement with regard to the result of the welding task is to be expected by changing the set values, the set values are stored as ideal welding parameters Pi for an overlap seam in the flat position. FIG. 2b shows the flat test workpieces 8 in a further position, the overhead position, FIG. 2c and FIG. 2d show the positions of the test workpieces 8 with a 45° tilted horizontally arranged test welding path 9 for which the ideal welding parameters Pi are also determined and stored. In the case of the straight test welding paths 9 shown here the direction of the tangential vector t is the same as the direction of the test welding path 9. FIG. 2e shows the perpendicular position of the test workpieces 8 for test welding paths 9 for storing the ideal welding parameters Pi for the vertical-down position or the vertical-up position. In addition, in certain intermediate positions, in FIG. 2f for example for a test welding path 9 ascending or descending at a defined angle 10, ideal welding parameters Pi are stored. In the exemplary embodiment an angle 10 of 45° is selected but an arbitrary number of intermediate positions and angles 10 can be selected here in order to obtain a higher number of ideal welding parameters Pi and angles 10 and therefore a better data basis for interpolating for different positions. Furthermore, ideal welding parameters Pi are recorded for different alignments of the test welding path 9 in relation to the gravitational acceleration vector g.

Figure 3A:
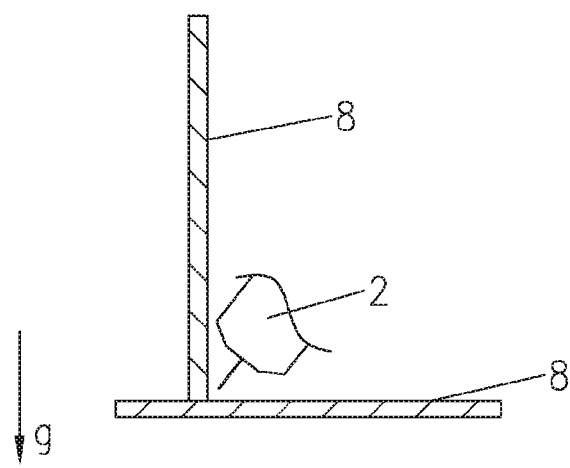
FIGS. 3a-3b show test workpieces for a fillet weld.
Figure 3B:
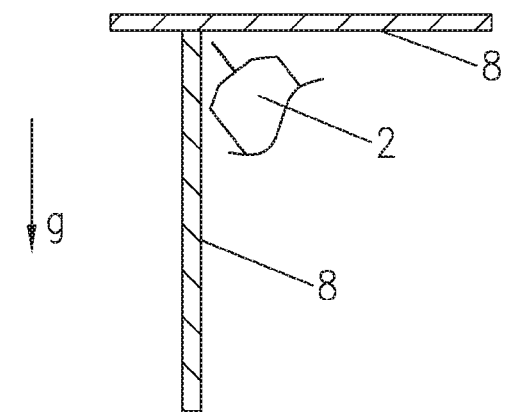

For other arrangements of the test workpieces 8, for example, a fillet weld shown in FIG. 3a and FIG. 3b in the flat or overhead position, a similar procedure should be followed.

For the sake of completeness, it is pointed out that not all welding processes can be executed in all positions. In particular, the executability of the welding process in the overhead position is material- and process-dependent. In this case, the ideal welding parameters Pi are only determined and stored for executable positions of the welding process.

The welding parameters Pi are then determined for the welding process of the real welding task to be carried out. This is accomplished for the respective point on the welding path 3 depending on the actual position and arrangement of the at least one workpiece 4 in relation to the gravitational acceleration vector g and the actual tangential vector t along the welding path 3. Since as already mentioned, at all points with the same position and arrangement of the workpiece 4 in relation to the gravitational acceleration vector g and the same tangential vector t of the welding path 3, the welding process with the same welding parameters P yields approximately the same results, the assignment can now preferably be made automatically without the assistance of a specialist. In order to establish the welding parameters P for a specific point on the welding path 3, the actual position and arrangement of the workpieces 4 and the tangential vector t of the welding path 3 is compared with the stored position and arrangement of the test workpieces 8 and the tangential vector t of the test welding path 9. For the precise actual position and arrangement of the workpieces 4 as well as the tangential vector t of the welding path 3, probably no ideal welding parameters Pi have been established and stored. Thus, the welding parameters P are established by interpolation of the ideal welding parameters Pi nearest to the actual position and arrangement and the actual tangential vector t of the welding path 3. By recording the ideal welding parameters Pi according to the method according to the invention, the welding parameters P of the welding process for different specific workpieces 4 can subsequently be established. In this case, the welding parameters P can, for example in a computer-assisted manner, be established directly during the welding process from the ideal welding parameters Pi. Before the actual welding parameters however, the welding parameters P established by the method can be used for a simulation of the welding process. Likewise it is conceivable that for systems with lower computing capacity, the welding parameters P are established in advance.

Figure 4:
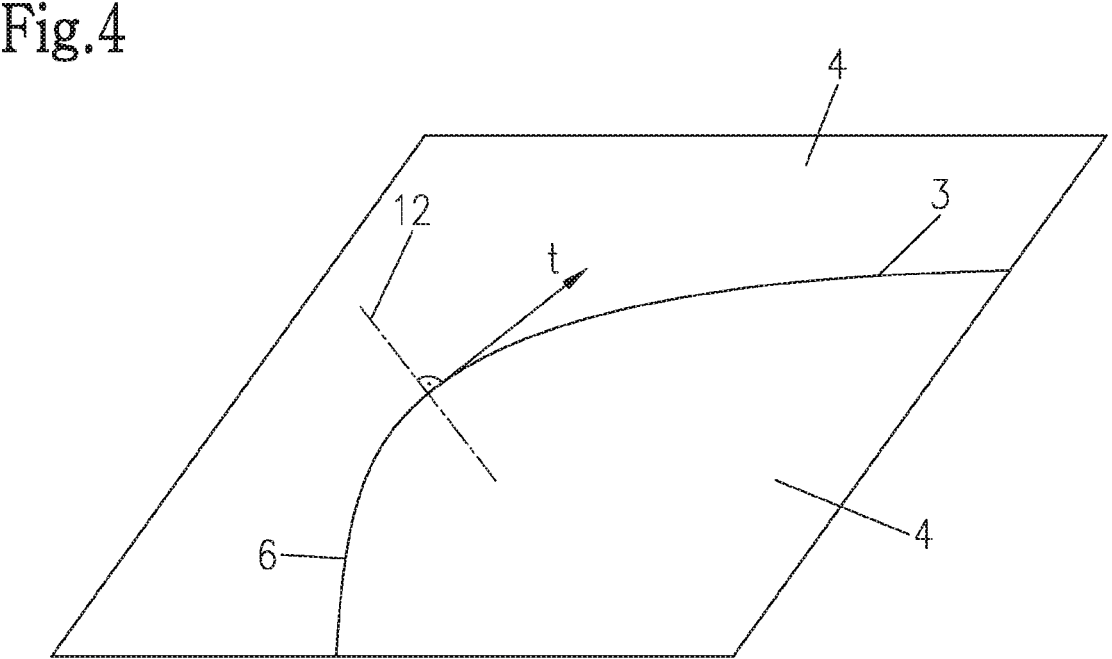
FIG. 4 shows a workpiece with the component vector plane for defining the component vector.
Figure 5:
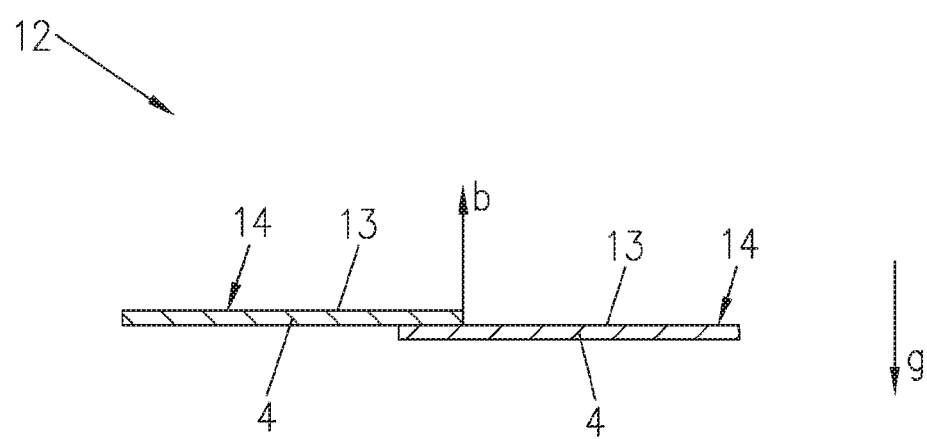
FIG. 5 shows the component vector in the component vector plane according to FIG. 4.

In the exemplary method, the establishment of the welding parameters P is simplified with the aid of a component vector b. To this end, as shown in FIG. 4, for points along the welding path 3 or the test welding path 9 a component vector b is defined relative to the gravitational acceleration vector g from the position and the arrangement of the workpieces 4 or test workpieces 8 in relation to the gravitational acceleration vector g. In the depicted exemplary embodiment, the component vector b is defined starting from the actual point on the welding path 3 in a plane 12 perpendicular to the tangential vector t of the welding path 3. This plane 12, hereinafter called component vector plane 12, intersects the workpieces 4 as shown in FIG. 5. The definition of the component vector b is now made in the component vector plane 12 via the angular symmetric line of the two tangents 13 of the workpiece surfaces 14 adjoining the welding path 3. For the aforementioned reasons, the influence of the gravitational force on the liquefied material 7, the component vector b is always determined with reference to the gravitational acceleration vector g.

Figure 6A:
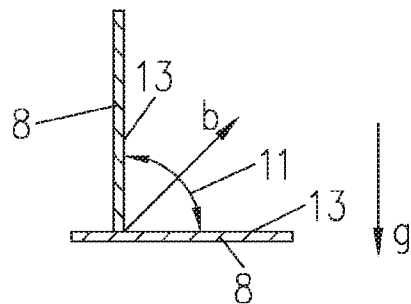
FIGS. 6a-6c show component vectors for different test workpiece arrangements.
Figure 6B:
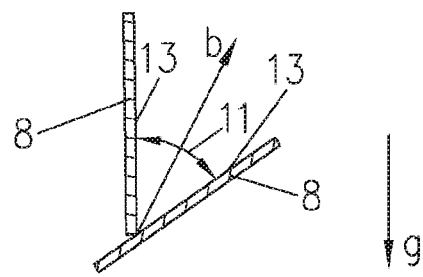
Figure 6C:
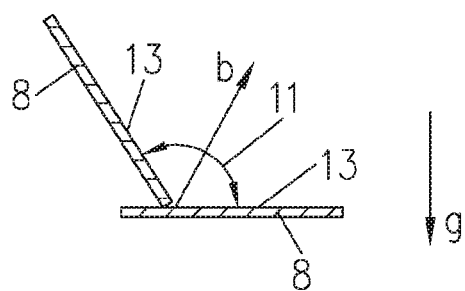

FIGS. 6*a*-6*c* show component vectors b for flat test workpieces 8 for solving different welding tasks.

Figure 7:
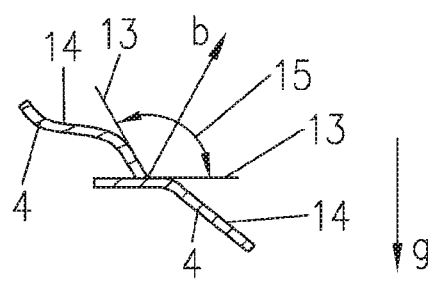
FIG. 7 shows the component vector of an uneven workpiece.

FIG. 7 shows the component vector b of a non-flat workpiece 4 in the direction of the angular symmetric line of the tangents 13 of the workpiece surfaces 14. The determination of the component vector b on the test workpiece 8 or workpiece 4 can be assisted by sensors which scan the workpiece surfaces or can take place automatically. The determination of the component vector b during so-called "teaching" of a welding path 3 is also feasible. Here on the one hand the component vector b can be defined by the angle of attack of the welding torch 2 or a definition can be made via additional points on the workpiece surfaces 14 on the left and right of the welding path 3. A manual input of the component vector b for the actual point on the welding path 3 can also be carried out before the welding process. Additional information can be provided relating to the magnitude of the component vector b such as, for example, the position of the upper sheet in the cases of an overlap seam, the shape of the seam such as fillet weld, butt weld and the like. If the component vector b is now determined at a point of the welding path 3 by the position and arrangement of the workpieces 4, this is compared with the component vectors b of the ideal welding parameters Pi to establish the welding parameters P. The welding parameters P for the actual component vector b or for the actual position are established by means of a subsequent interpolation of the nearest ideal welding parameters Pi. When using a component vector b, only a comparison of the component vector b is necessary instead of the complex comparison of position and arrangements of the workpieces 4, 8 with the result that a computer-assisted implementation of the method is simplified.

Figure 8:
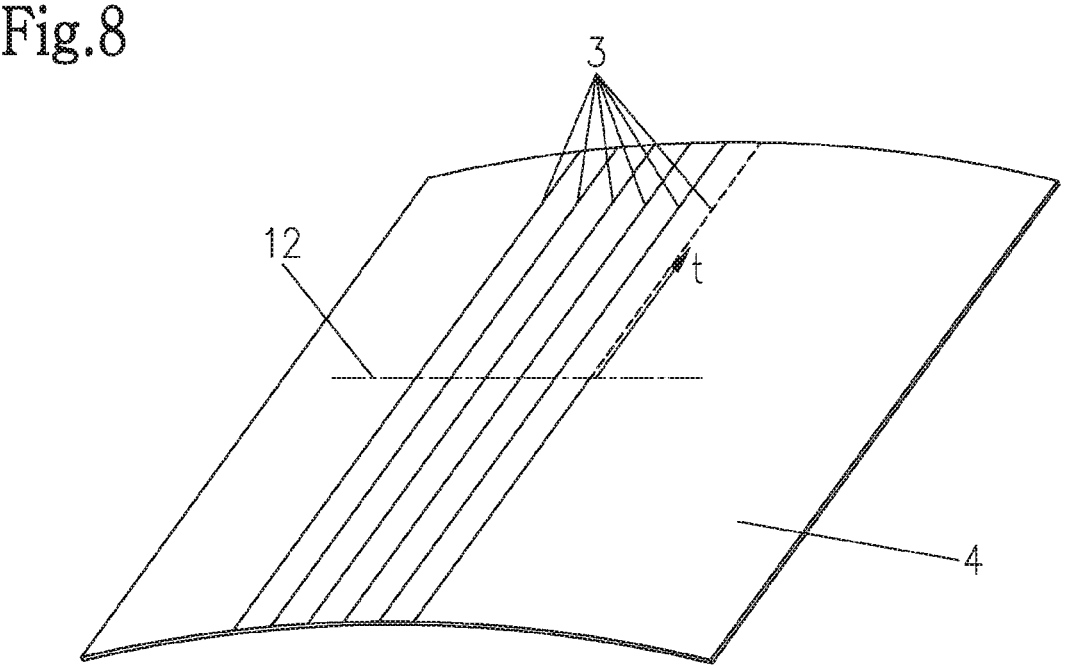
FIG. 8 shows an example for deposition welding on a workpiece.
Figure 9:
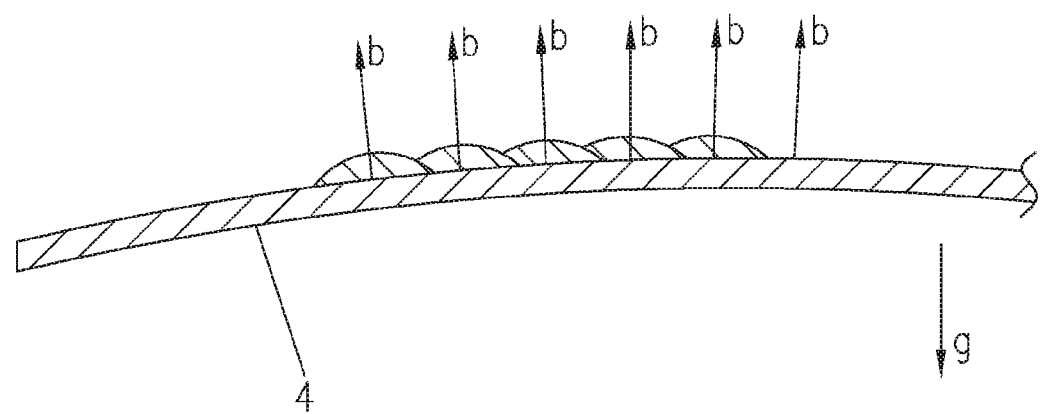
FIG. 9 shows the component vector in the case of exemplary deposition welding.

FIG. 8 shows the application of a method according to the invention for deposition welding on a curved workpiece 4. The parallel welding paths 3 shown in the example are cut at right angles by the component vector plane 12. The relevant cross-section is shown in FIG. 9 from which it can be seen that the component vector b in deposition welding is directed normal to the workpiece surface and at the same time is perpendicular to the tangential vector t of the welding path 3. The method can also be used for the generative fabrication of workpieces not shown in detail here.

In the case of the welding parameters P to be established, inter alia the welding current, the conveying speed of a welding wire, the angle of attack of the welding torch to the workpieces and the welding speed can be determined. The welding process used, such as standard, pulses or CMT welding process can also be stored as welding parameter. Thus for example, for the overhead position a different welding process can be used to optimally solve the welding object. Furthermore, it is conceivable to define a relative position of the TCP to the welding path in the welding parameters. This allows the torch to be displaced in the direction of the upper sheet in the case of an overlap seam in order to perform the welding task with increased melting of material.

In order to simplify the determination of the ideal welding parameters Pi, these are established by means of test welding processes along test welding paths 9 with constant tangential vector t and constant component vector b and stored. The set values can be varied along the test welding path 9 and the results of the test welding process then assessed. The assessment can be made optically, for example by means of microsections. It is not necessary to determine component vector b and tangential vector t at the point or region with the preferred results of the test welding process as a result of uniform component vectors b and tangential vectors t over the entire test welding path 9.

As already shown in FIG. 2, the ideal welding parameters Pi are determined by means of test welding processes on test workpieces 8 with constant curvature along the test welding paths 9 and stored. The flat test workpieces 8 with a constant tangential vector t shown in the example yield a constant tangential vector t and constant component vector b. This facilitates the determination of the ideal welding parameters Pi.

In particular in the case of test welding processes along the test welding paths 9 between 10 cm and 150 cm long, the influence of start and end of the welding process is negligible in the centre. In addition, in the case of constant ideal welding parameters Pi over the entire test welding path 9 of the proposed length the results can also be assessed mechanically, for example, by means of load tests. Such stored ideal welding parameters Pi allow a high reproducibility of the results of the test welding process. Advantageously many test welding processes are carried out on the test workpieces 8 in order to determine the values of the ideal welding parameters Pi.

Preferably the ideal welding parameters Pi are determined by means of test welding processes using different welding wires having different diameters and different materials and stored. In this case, a new dataset of ideal welding parameters Pi is stored according to different diameters or material. When establishing the welding parameters P of the welding process to be carried out, the diameter and material of the welding wire used are then input and the welding parameters P for the welding process to be carried out are established as a function of the input diameter and material of the welding wire.

Ideal welding parameters Pi for the beginning of the welding process are stored as welding start parameters Pi_S. This improves the method since at the beginning of the welding process, process parameters such as temperature or also the quantity of liquefied material 7 vary substantially. Likewise welding end parameters Pi_E are determined for the end of the welding process by means of test welding processes and stored. The determination of the welding start parameters Pi_S and welding end parameters Pi_E is naturally also made for different positions and arrangements as well as tangential vectors t of the test welding path 9. In this case, position and arrangement can be recorded with the aid of a component vector b. Using the welding start parameters Pi_S, welding end parameters Pi_E and ideal welding parameters Pi for the course of a test welding path 9, the welding parameters P for the welding process to be carried out are established by interpolation. In order to illustrate this process, welding start parameters Pi_S, welding end parameters Pi_E and ideal welding parameters Pi can each be considered as a multidimensional field wherein the ideal welding parameters Pi are stored for the specific tangential vector t of the welding path 3, test welding path 9 and component vector Pi. Depending on the actual position, the actual location and arrangement of the workpieces or component vector, the welding parameters P for the start of the welding process to be carried out are now established for the beginning of the welding process from the field of the welding start parameters Pi_S by interpolation. For the next point on the welding path 3 welding parameters P both in the field of the welding start parameters Pi_S and also in the field of the ideal welding parameters Pi are found by interpolation. These welding parameters P are now interpolated from the two different fields weighted in a time- or distance-dependent manner in order to create a continuous transition from the welding start parameters Pi_S to the ideal welding parameters Pi. This is performed similarly for the end of the welding process. In this case, it should be noted that welding start parameters Pi_S or welding end parameters Pi_E define the execution of the start and end process and thus represent a sequence which can also include time values and can require movements at a position, for example, the change in the angle of attack of the welding torch. With welding start parameters Pi_S or welding end parameters Pi_E thus defined, the weighted interpolation with the ideal welding parameters Pi on the welding path is accomplished using the last values of the welding start parameters Pi_S or using the first values of the welding end parameters Pi_E. Using the method executed in such a manner, continuously advantageous welding parameters P for the welding process are set over the entire welding path 3, including beginning and end. This is particularly advantageous when forming so-called step seams in which the weld seam 6 is regularly interrupted by seamless regions.

The ideal welding parameters Pi can be determined by means of test welding processes at several specific opening angles between the test workpieces 8 and stored. The welding parameters P for the welding process to be carried out are then established depending on the actual opening angle 15 between the workpieces 4 by interpolation of the values of the ideal welding parameters Pi at the specific opening angles 11 between the test workpieces 8. Since the opening angle 15 between the workpieces 4 influences the welding process, an improved result of the actual welding task can be achieved.

The ideal welding parameters Pi can also be determined by means of test welding processes at several specific temperatures of the test workpieces 8 and stored. The welding parameters P for the welding process to be carried out are then established depending on the actual temperature of the workpieces 4 by interpolation of the values of the ideal welding parameters Pi at the specific temperatures of the test workpieces 8. For illustration the temperature can be considered as a further dimension of the field of ideal welding parameters Pi. The adaptations of the welding parameters P to the temperature ensures the advantageous execution of the welding process.

The cooling situation can also form an additional dimension of the field of ideal welding parameters since the cooling situation influences the temperature profile of the welding process. Taking into account the cooling situation therefore allows an advantageous establishment of the welding parameters P. To this end, the cooling situation must be stored with the ideal welding parameters Pi and input before establishing the welding parameters P of the welding process to be carried out. To this end, for example, the cooling behaviour of the weld seam can be measured in test welding processes or a correction factor can be input for the actual cooling situation.

The ideal welding parameters Pi can also be determined using test welding processes of various materials and stored. Again, in order to establish the welding parameters P of the welding process to be carried out, the materials of the workpieces 4 are input, whereupon the welding parameters P for the welding process to be carried out are established depending on the input materials of the workpieces 4. Various materials here also means materials of the same substance with different wall thicknesses.

It is also advantageous to take into account the geometrical conditions to establish the welding parameters P. This means in particular different gap width, workpiece offset, angle between the workpieces, fluctuation of the so-called processing and the like. In order to take into account the geometrical conditions, the ideal welding parameters Pi are determined by means of test welding processes under several specific geometrical conditions for the test workpieces 8 and stored. If a deviation occurs when establishing the welding parameters P for the welding process to be carried out under the actual geometrical conditions, the welding parameters P are adapted to the changed geometrical conditions, optionally by means of an interpolation. The use of this method is particularly efficient when measuring the geometrical conditions on the actual workpiece 4. If, for example, the gap width between the workpieces 4 is recorded whilst executing the welding process and monitored, when a change in the gap width is identified, ideal welding parameters Pi of the new gap width can be used automatically to establish the welding parameters P. This allows the fraction of defective fabricated workpieces 4 to be reduced and thus increase the efficiency of the fabrication. In order to allow for geometrical deviations or disturbances, the welding parameters P must usually be established in real time during the welding process.

Figure 10A:
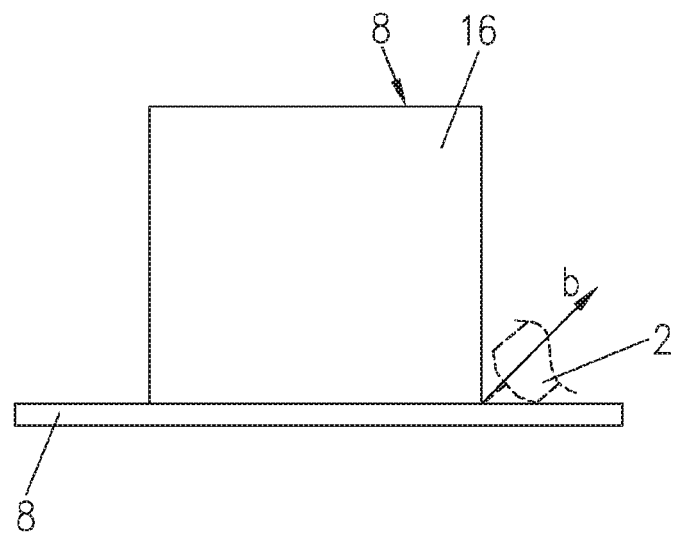
FIG. 10a shows a front view of test workpieces with a welding path of constant curvature.
Figure 10B:
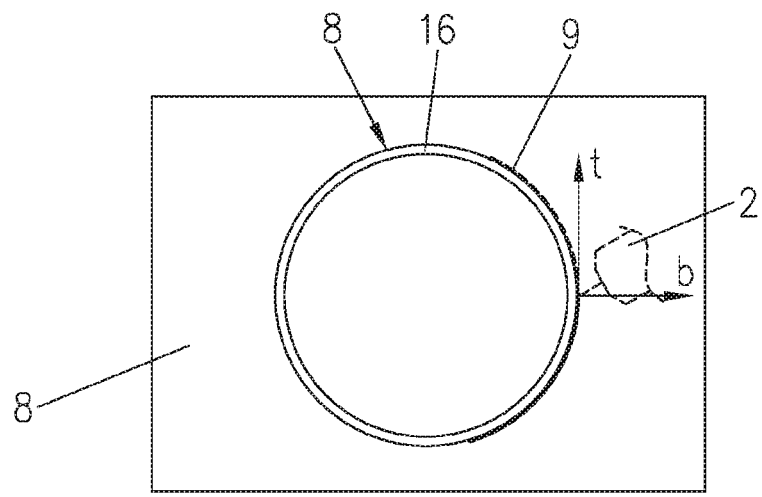

In one embodiment of the method the radius of curvature at the respective position along the welding path 3 is used as a further parameter to establish the welding parameters P. In addition to the tangential vector t of the welding path 3, the radius of curvature of the welding path 3 also has an influence on the ideal welding parameters Pi. These influences are accomplished, for example, via the temperature since in the case of small radii of curvature, the welding process takes place in a locally delimited region. The result is an increased heating of the workpiece 4. Taking into account the radius of curvature during storage of the ideal welding parameters Pi as well as establishing the welding parameters P can thus result in advantages when carrying out the welding process. The ideal welding parameters Pi can in this case advantageously be determined by moving the test workpieces 8 with a test welding path 9 of constant curvature with a stationary welding torch 2. As a result, both the tangential vector t of the test welding path 9 and also the component vector b are constant, which simplifies a unique assignment of the ideal welding parameters Pi to the tangential vector t, component vector b and curvature. FIGS. 10a and b show for this purpose an example of an arrangement of test workpieces 8 which has a test welding path 9 having constant curvature. In detail FIG. 10a shows a front view and FIG. 10b shows a plan view of a test workpiece 8, i.e. a pipe 16, which is arranged on a flat test workpiece 8. In this arrangement, the requirement for a constant curvature with simultaneously constant component vector b and tangential vector t can be achieved by means of a pure rotation of the test workpieces 8 simply and cost-effectively using a rotary table not shown in detail.

The geometry of the workpieces 4 in the surroundings of the respective position also the welding path 3 can also be taken into account when establishing the welding parameters P. The geometry of the workpieces 4 specifically influences the cooling and surface tension of the liquefied material 7. Taking into account the geometry of the workpieces 4 in the surroundings of the respective position thus brings about overall an improved establishment of the welding parameters P.

Establishing the welding parameters P for points on the welding path 3 can be carried out for the welding process to be carried out at regular time intervals or regular distances of the welding path 3. In the case of time intervals shorter than 100 ms, an almost continuous transition is obtained between successive welding parameters P. Accordingly, the use of greater time intervals is feasible, in particular when the computing capacity is not sufficient for establishing welding parameters P with a shorter interval.

The invention claimed is:

1. A method for establishing a plurality of welding parameters for a welding process in which a welding torch is guided along a predefined arbitrary welding path over at least one workpiece to be worked and the plurality of welding parameters determined depending on a respective position on the welding path are set for working of the at least one workpiece, the method comprising the steps of:
   determining a plurality of ideal welding parameters by means of a plurality of test welding processes on a plurality of test workpieces along at least one test welding path on each test workpiece of the plurality of test workpieces under a specific position and arrangement of each test workpiece of the plurality of test workpieces in each case in relation to a gravitational acceleration vector and a specific tangential vector of a respective test welding path of the at least one test welding path on each test workpiece;
   storing the plurality of ideal welding parameters as a plurality of stored ideal welding parameters;
   interpolating a plurality of values of the plurality of stored ideal welding parameters for the plurality of specific positions and arrangements of the plurality of test workpieces in relation to the gravitational acceleration vector and the specific tangential vectors of the plurality of test welding paths in order to establish the plurality of welding parameters at the respective position on the welding path for the welding process to be carried out depending on an actual position and arrangement of the at least one workpiece in relation to a gravitational acceleration vector and an actual tangential vector of the welding path; and determining the plurality of ideal welding parameters by means of the plurality of test welding processes on the plurality of test workpieces with a respective constant curvature along the at least one test welding path on each test workpiece of the plurality of test workpieces.

2. The method according to claim 1, wherein at least for individual points along the welding path of the at least one workpiece to be worked and along the at least one test welding path on each test workpiece of the plurality of test workpieces, a component vector is defined relative to the gravitational acceleration vector from the position and the arrangement of the at least one workpiece or the plurality of test workpieces in relation to the gravitational acceleration vector.

3. The method according to claim 1, wherein at least a welding current, a conveying speed of a welding wire, an angle of attack of the welding torch to the at least one workpiece and a welding speed are selected as the plurality of welding parameters.

4. The method according to claim 2, wherein the plurality of ideal welding parameters is determined by means of the plurality of test welding processes along the at least one test welding path on each test workpiece of the plurality of test workpieces having a respective constant tangential vector and a respective constant component vector and are stored.

5. The method according to claim 1, wherein the plurality of ideal welding parameters is determined by means of the plurality of test welding processes along the at least one test welding path on each test workpiece of the plurality of test workpieces between 10 cm and 150 cm long and are stored.

6. The method according to claim 1, wherein the plurality of ideal welding parameters are determined by means of the plurality of test welding processes with various welding wires having various diameters and various materials and are stored, wherein a diameter and a material of a welding wire used is input to establish the plurality of welding parameters of the welding process and the plurality of welding parameters for the welding process to be carried out are established depending on the diameter and the material of the welding wire as input.

7. The method according to claim 1, wherein the plurality of ideal welding parameters for a beginning of a test welding process of the plurality of test welding processes is determined as a plurality of welding start parameters and/or for an end of a test welding process of the plurality of test welding process is determined as a plurality of welding end parameters on the plurality of test workpieces and stored and that the plurality of welding parameters for the welding process to be carried out begin with the plurality of welding start parameters and/or end with the plurality of welding end parameters, which are determined according to the actual position and arrangement of the at least one workpiece in relation to the gravitational acceleration vector and the actual tangential vector at the respective position by interpolation of the values of the stored plurality of welding start parameters or plurality of welding end parameters for the specific positions and arrangements of the plurality of test workpieces in relation to the gravitational acceleration vector and the specific tangential vectors.

8. The method according to claim 7, wherein the plurality of welding parameters at the beginning of the welding process between a welding start parameter of the plurality of welding start parameters and the plurality of ideal welding parameters or at the end of the welding process between the plurality of ideal welding parameters and a welding end parameter of the plurality of welding end parameters are interpolated weighted with a distance on the welding path or the time.

9. The method according to claim 1, wherein the plurality of ideal welding parameters is determined by means of the plurality of test welding processes at several specific opening angles between the plurality of test workpieces and are stored, and the plurality of welding parameters for the welding process to be carried out is determined depending on plurality of an actual opening angle between the at least one workpiece by interpolation of the values of the plurality of ideal welding parameters at the specific opening angles between the plurality of test workpieces.

10. The method according to claim 1, wherein the plurality of ideal welding parameters is determined by means of the plurality test welding processes at several specific temperatures of the plurality of test workpieces and are stored and the plurality of welding parameters for the welding process to be carried out are established depending on a determined actual temperature of the at least one workpiece by interpolation of the values of the plurality of ideal welding parameters at the specific temperatures of the plurality of test workpieces.

11. The method according to claim 1, wherein the plurality of ideal welding parameters is determined by means of the plurality of test welding processes under several specific cooling situations of the plurality of test workpieces and are stored, a cooling situation of the at least one workpiece is input to establish the plurality of welding parameters of the welding process and the plurality of welding parameters for the welding process to be carried out are determined as a function of the input cooling situation of the at least one workpiece.

12. The method according to claim 1, wherein the plurality of ideal welding parameters is determined by means of the plurality of test welding processes on the plurality of test workpieces made of different materials and are stored, a material of the at least one workpiece is input to establish the welding parameters of the welding process and the plurality of welding parameters for the welding process to be carried out is established depending on the input material of the at least one workpiece.

13. The method according to claim 1, wherein the plurality of ideal welding parameters is determined by means of the plurality of test welding processes under several specific geometrical conditions for the plurality of test workpieces and are stored, and wherein the plurality of welding parameters for the welding process to be carried out is established depending on a plurality of determined actual geometrical conditions for the at least one workpiece by interpolation of a plurality of values of the plurality of ideal welding parameters under the specific geometrical conditions for the plurality of test workpieces.

14. The method according to claim 1, wherein the plurality of welding parameters for the welding process to be carried out on the at least one workpiece is established taking into account a respective radius of curvature at a respective position along the welding path.

15. The method according to claim 1, wherein the plurality of welding parameters for the welding process to be carried out on the at least one workpiece is established taking into account a geometry of the at least one workpiece in the surroundings of the respective position along the welding path.

16. The method according to claim 1, wherein the plurality of welding parameters for the welding process to be carried out is established at regular time intervals or regular distances of the welding path.

* * * * *